United States Patent [19]

Toth

[11] Patent Number: 5,135,242
[45] Date of Patent: Aug. 4, 1992

[54] ADJUSTABLE CHUCK FOR GRIPPING WORKPIECES OF DIFFERENT SIZES AT CONTROLLED PRESSURES

[75] Inventor: Paul Toth, Allen Park, Mich.

[73] Assignee: Illinois Tool Works Inc., Glenview, Ill.

[21] Appl. No.: 703,405

[22] Filed: May 21, 1991

[51] Int. Cl.$^5$ ............................................. B23B 31/24
[52] U.S. Cl. ................................. 279/4.02; 279/109; 279/123; 279/126
[58] Field of Search .................... 279/1 R, 1 ME, 2 A, 279/4, 110, 123, 1 J, 106, 109, 111, 118–120; 82/118, 165

[56] References Cited

U.S. PATENT DOCUMENTS

| | | | |
|---|---|---|---|
| 3,099,457 | 7/1963 | Hohwart et al. | 279/106 |
| 3,423,098 | 1/1969 | Hohwart et al. | 279/109 |
| 3,472,526 | 10/1969 | Hohwart | 279/106 |
| 4,011,777 | 3/1977 | McConnell | 279/4 X |
| 4,254,676 | 3/1981 | Wilson | 279/1 R X |
| 4,502,704 | 3/1985 | Jackson | 279/1 R X |
| 4,536,000 | 8/1985 | Rohm | 279/1 R |
| 4,624,466 | 11/1986 | Steinberger | 279/1 R |
| 4,824,126 | 4/1989 | Martin | 279/1 C |
| 4,909,521 | 3/1990 | Ovanin | 279/1 R |

*Primary Examiner*—Steven C. Bishop
*Attorney, Agent, or Firm*—Dressler, Goldsmith, Shore, Sutker & Milnamow, Ltd.

[57] ABSTRACT

In an adjustable chuck for gripping workpieces of different sizes, three jaws are mounted for relative movement. A hydraulically driven mechanism is operable selectively for closing the jaws to grip a workpiece and for opening the jaws to free the workpiece. Two strain gauges on one of the jaws sense the gripping force applied by the jaws to the workpiece. A computer, which responds to the strain gauges, coacts with a control relay and with hydraulic valves to control flow of hydraulic fluid into and from the closing and opening mechanism. A system comprising a plurality of such chucks is contemplated, in which one computer coacts therewith to control the closing and opening mechanism of any selected chuck of the system, and which adjusts itself for minor variations among the system chucks.

5 Claims, 4 Drawing Sheets

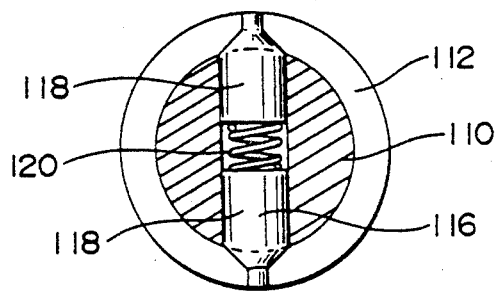
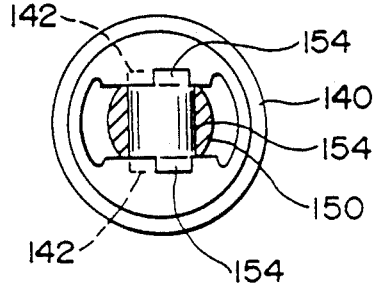
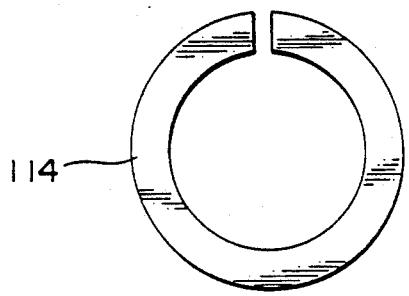
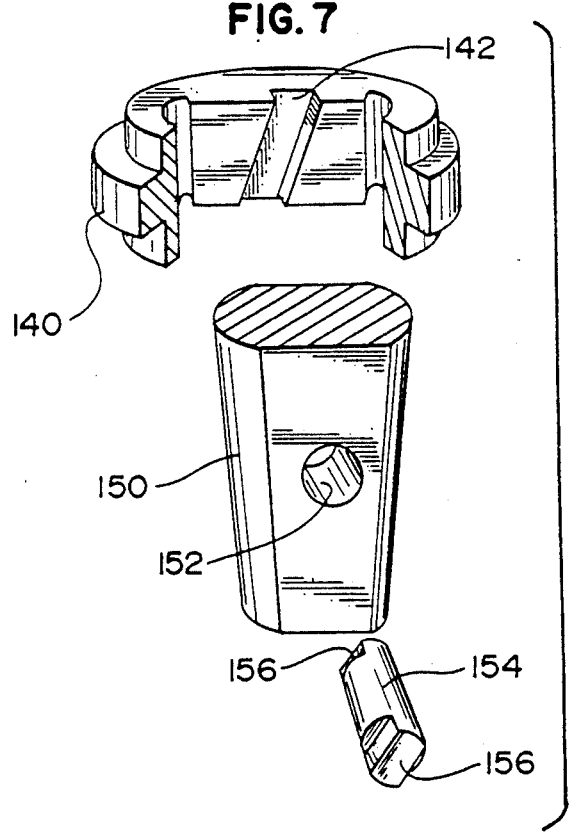

ADJUSTABLE CHUCK FOR GRIPPING WORKPIECES OF DIFFERENT SIZES AT CONTROLLED PRESSURES

TECHNICAL FIELD OF THE INVENTION

This invention pertains to an adjustable chuck for gripping workpieces of different sizes. The adjustable chuck senses and controls the gripping force applied by its jaws to a workpiece.

BACKGROUND OF THE INVENTION

Typically, an adjustable chuck of a type in widespread use for gripping workpieces of different sizes comprises a trio of jaws, which are mounted for relative movement between an opened condition and a closed condition, and a screw-driven mechanism, which is operable selectively for closing the jaws to grip a workpiece and for opening the jaws to free the workpiece.

Commonly, the screw-driven mechanism is actuated by a hydraulic motor, via couplers enabling the chuck to be selectively coupled to such mechanism and uncoupled therefrom. Commonly, a plural number of such chucks are associated with a greater or lesser number of machine tools capable of employing such chucks interchangeably, in a manufacturing cell.

Adjustable chucks of the type noted above are exemplified in prior patents including Hohwart et al. U.S. Pat. No. 3,423,098 and Hohwart U.S. Pat. No. 3,472,526. Similar chucks, in which the jaws may be selectively arranged to grip externally or internally, are available commercially from ITW Woodworth (a division of Illinois Tool Works Inc.) of Detroit, Mich., under its trade designation "Universal Ball-Lok Power Chucks."

When such a chuck is used to grip a fragile workpiece, such as a thin-walled tube being gripped externally or internally, it is important to grip the workpiece firmly but not to distort the workpiece by causing the workpiece to become out-of-round or otherwise. It is desirable, therefore, to control the gripping force applied by the jaws to the workpiece within close tolerances. It is difficult to maintain close tolerances, however, because of such factors as manufacturing tolerances, surface finishes, and lubrication.

For many years, there has been a need, which heretofore has not been effectively addressed, for a better way to control the gripping force applied to a workpiece by the jaws of such a chuck. The need has been critical in some industries, such as the aircraft industry and the construction equipment industry.

SUMMARY OF THE INVENTION

This invention addresses the aforenoted need and provides a significant improvement in an adjustable chuck of the type noted above for gripping workpieces of different sizes. An adjustable chuck embodying this invention senses and controls the gripping force applied by its jaws to a workpiece.

Such a chuck is similar to adjustable chucks known heretofore in comprising a plurality of jaws, which are mounted for relative movement between an opened condition and a closed condition, and in comprising a mechanism for closing the jaws to grip a workpiece. The mechanism closes the jaws by causing relative movement of the jaws toward the closed condition. The same mechanism may be also used to open the jaws.

An adjustable chuck embodying this invention has a device or devices associated with at least one of the jaws for sensing the gripping force applied by the jaws to the workpiece when the jaws are closed to grip the workpiece and a controller responsive to such device or devices for controlling the mechanism noted above in such manner that the gripping force applied by the jaws to the workpiece approximates a desired magnitude. At least one strain gauge may be thus associated operatively with one of the jaws for sensing such force. It is preferred to use a pair of strain gauges.

Preferably, the controller comprises a hydraulic motor, which is arranged to drive the closing mechanism for closing the jaws to grip the workpiece, and devices for controlling flow of hydraulic fluid relative to the hydraulic motor. These devices, which may comprise solenoid valves, may be computer-controlled via a control relay.

A system that may be advantageously used in a manufacturing cell, as mentioned above, is contemplated by this invention. The system comprises a plurality of similar, adjustable chucks, each comprising a plurality of jaws, a closing mechanism, and a sensing device or sensing devices, as discussed above.

The system comprises a controller, such as the controller described above, which is responsive to the sensing device or sensing devices of any selected chuck of the system. The controller is used for controlling the closing and opening mechanism of the selected chuck in such manner that the gripping force applied by the jaws of the selected chuck approximate the desired magnitude. The controller is operable in such manner that the gripping force applied by the jaws of each chuck of the system approximates the desired magnitude despite minor dimensional variations, variations in lubrication, and other variations from one chuck of the system to another.

The system may be enhanced by operating the controller, in a manner responsive to the sensing device or sensing devices of the respective chucks of the system, for controlling the closing mechanisms of the respective chucks of the system in such manner that the gripping force applied by the jaws of each chuck of the system approximates a desired magnitude. The desired magnitude may vary from one chuck of the system to another.

These and other objects, features, and advantages of this invention are evident from the following description of a preferred embodiment of this invention with reference to the accompanying drawings.

BRIEF DESCRIPTION OF THE DRAWINGS

FIG. 4 is a sectional detail taken along line 4—4 of FIG. 3 in a direction indicated by arrows. FIG. 5 is a related detail.

FIG. 6 is a sectional detail taken along line 6—6 of FIG. 3 in a direction indicated by arrows.

FIG. 7 is a fragmentary, exploded, perspective detail of certain components appearing in FIG. 3.

DETAILED DESCRIPTION OF PREFERRED EMBODIMENT

Figure 1:
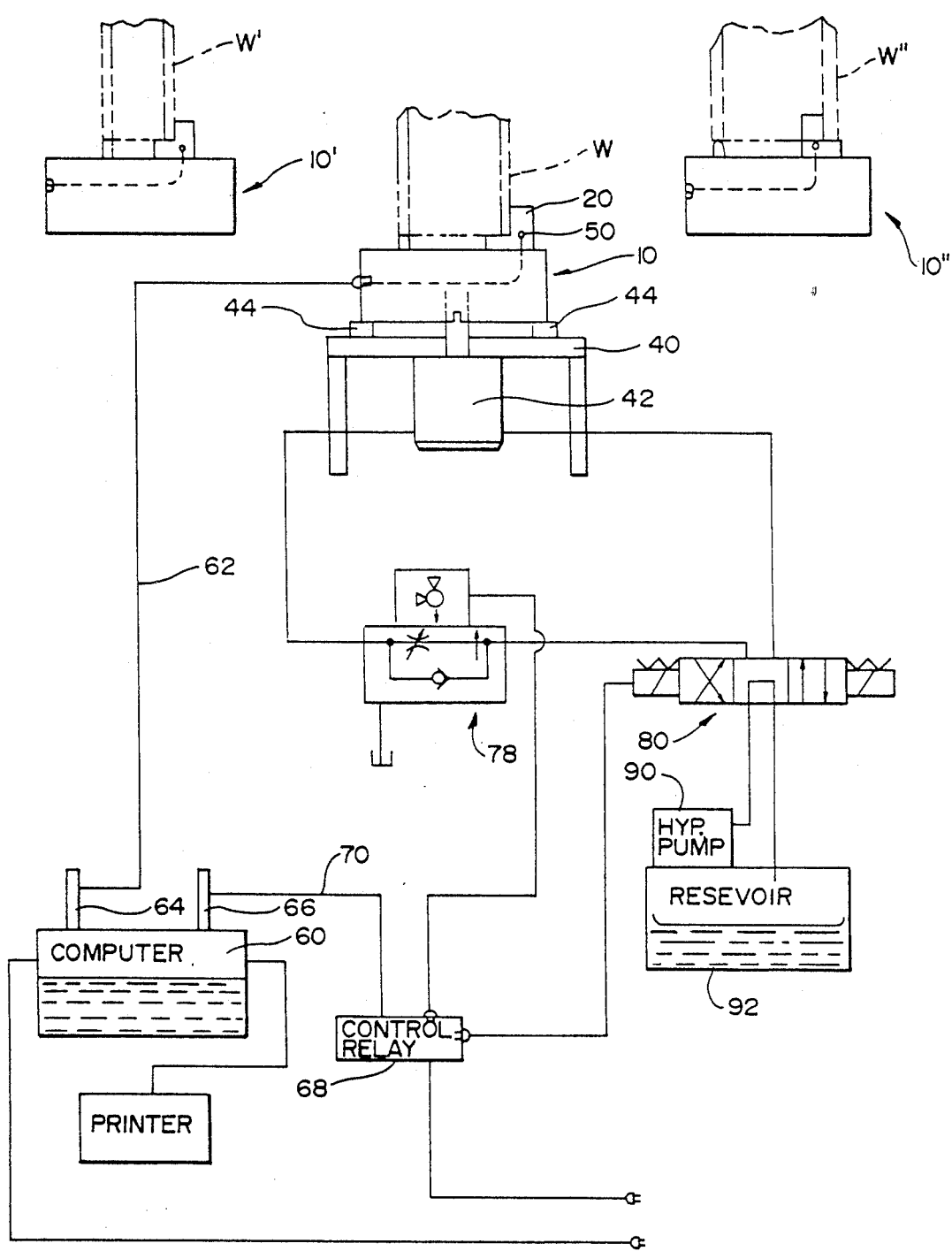
FIG. 1 is a schematic view of a system comprising three similar, adjustable chucks, a loading and unloading stand supporting a hydraulic motor, and related components, as contemplated by this invention.

As shown in the drawings, an adjustable chuck 10 constituting a preferred embodiment of this invention is useful for gripping workpieces of various sizes, such as a tubular workpiece W shown in FIG. 1. The chuck 10 senses and controls the gripping force, as applied by the jaws of the chuck 10 to a workpiece, in such manner that the gripping force approximates a desired magnitude, e.g., 15,000 lbs. Generally, close tolerances are achieved, whereby the gripping force does not differ from the desired magnitude by more than about two to four percent, e.g., 300 lbs. to 600 lbs.

Moreover, this invention contemplates that the chuck 10 may be advantageously used in a system with other chucks similar thereto, such as the chucks 10', 10", shown in FIG. 1. In the contemplated system, the gripping force applied by the jaws of each chuck approximates a desired magnitude, as discussed above, despite minor dimensional variations, variations in lubrication, and other variations from one chuck of the system to another.

Except as disclosed herein, the chuck 10 is similar to adjustable chucks that heretofore have been available commercially from ITW Woodworth, supra, under its trade designation "Universal Ball-Lok Chucks." Moreover, the chuck 10 is similar in some respects to the adjustable chucks disclosed in Hohwart et al. U.S. Pat. No. 3,423,098 and Hohwart U.S. Pat. No. 3,472,526.

Figure 2:
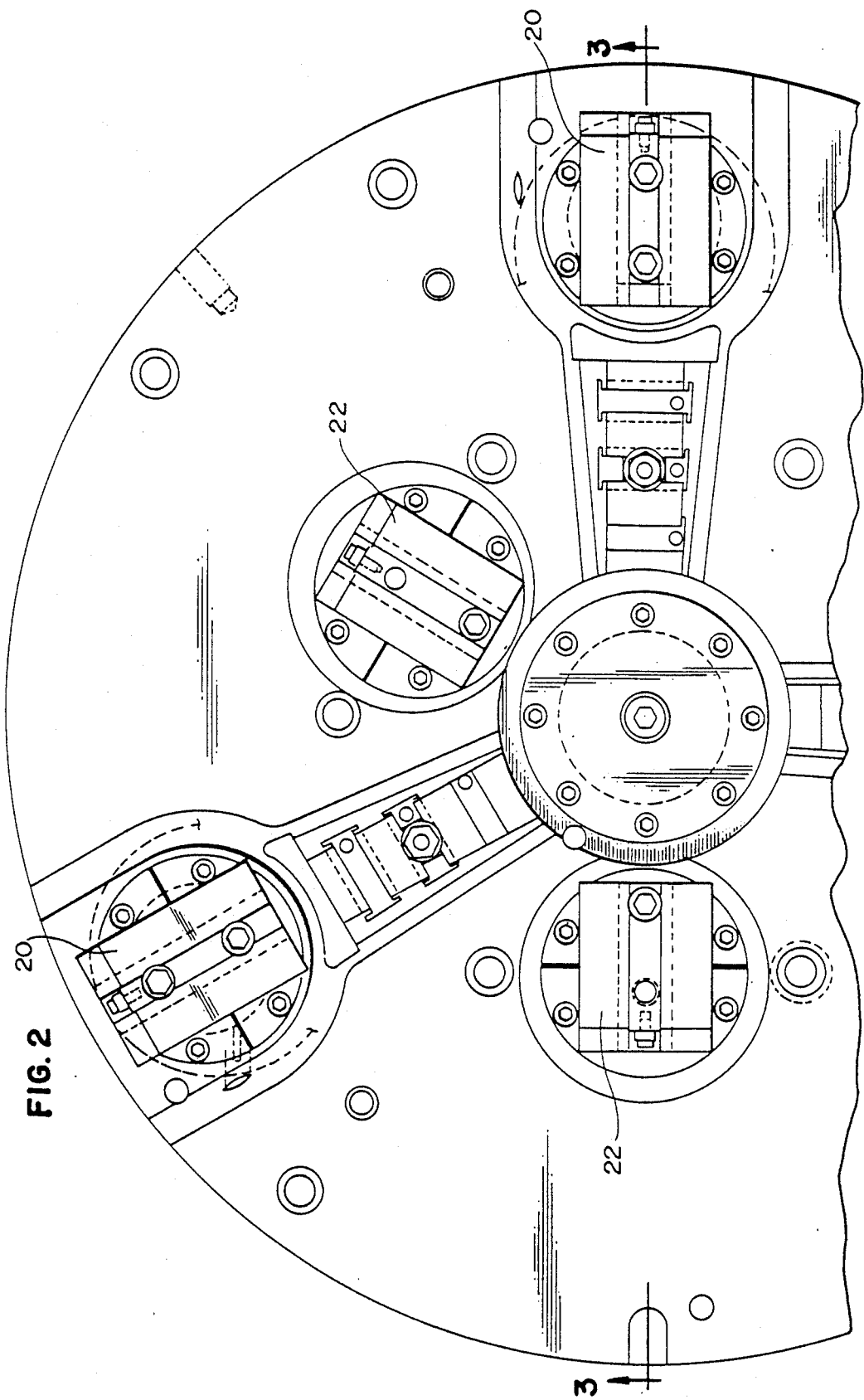
FIG. 2 is a fragmentary, plan view of a representative one of the adjustable chucks used in the system of FIG. 1.
Figure 3:
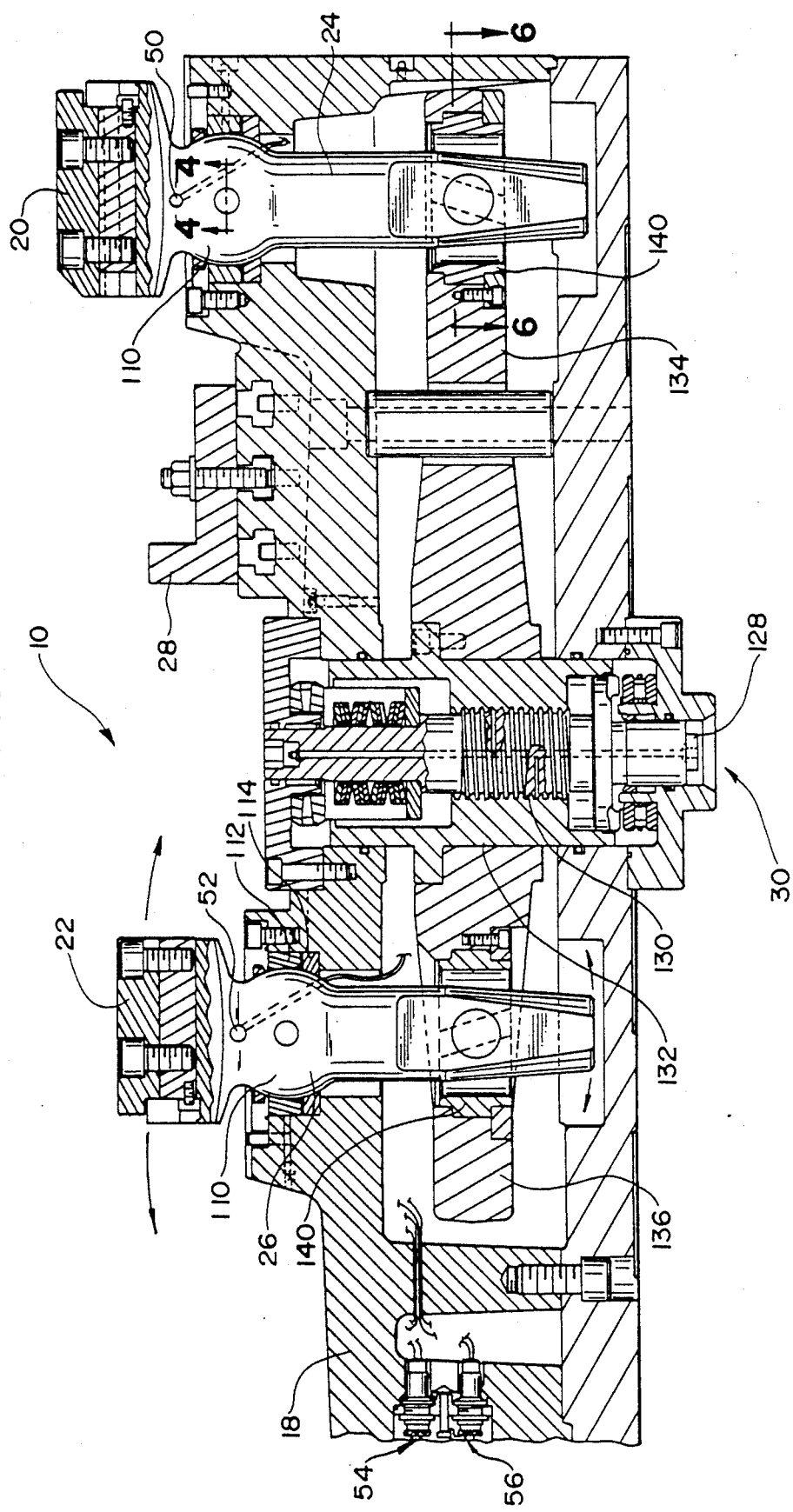
FIG. 3 is a sectional view taken along line 3—3 of FIG. 2, in a direction indicated by arrows.

As shown in FIGS. 2 and 3, the chuck 10 has a main body 18, an outer set of three similar jaws 20, and an inner set of three similar jaws 22. Each jaw 20 is mounted on a rocker arm 24, which is mounted to the main body 18 in a known manner so as to permit pivotal movement of the rocker arm 24 over a limited range of pivotal movement. Each jaw 22 is mounted on a rocker arm 26, which is mounted to the main body 18 is a similar manner. The jaws 20 of the outer set are used to grip a comparatively large workpiece. The jaws 22 of the inner set are used to grip a comparatively small workpiece. The chuck 10 has a screw-actuated mechanism 30, which coacts with the rocker arms 24, 26, in a known manner selectively to open the jaws being used by moving such jaws away from a central axis of the chuck 10 and to close such jaws by moving such jaws toward the central axis.

If the jaws 20 of the outer set are used, the jaws 22 of the inner set are removed from the rocker arms 24, and such arms 24 are covered. If the jaws 22 of the outer set are used, the jaws 20 of the outer set are removed, and such arms are covered. Also, plural work stops 28 mounted on the main body 18 coact with the jaws being used, so as to support a workpiece being gripped by such jaws. In FIG. 1, one of the jaws 20 of the outer set is shown as being used to grip the tubular workpiece W, and as coacting with such a work stop 28 to support the workpiece W.

The jaws of each set and the rocker arms associated therewith may be selectively adjusted in a known manner to grip a workpiece externally and to grip a workpiece internally. In FIG. 1, the chuck 10 is shown as gripping the tubular workpiece W externally. Also, the chuck 10' is shown as gripping a smaller, tubular workpiece W' externally, and the chuck 10" is shown as gripping a larger, tubular workpiece W" internally.

Although the screw-actuated mechanism 30 is employed in commercially available chucks and should be well understood by persons having ordinary skill in the art, an abbreviated description of some of its structural features follows for convenience.

An upper portion 110 of each rocker arm 24, 26, is spherical and is mounted operatively in a bearing assembly, which comprises an upper member 112 and a lower member 114. Each bearing member 112, 114, is split so as to permit the upper portion 110 of such rocker arm 24, 26, to be thus mounted. The upper portion 110 has a transverse aperture 116 accommodating a pair of detents 118, which are biased outwardly by a spring 120 therebetween. Each detent 118 fits into a respective one of a pair of recesses 122 in the upper member 112 so as to mount such rocker arm 24, 26, pivotally.

A driving screw 130 has a lower coupler 128, which is adapted to coact with a matched coupler on the output shaft of the hydraulic motor 42, whereby the hydraulic motor 42 can rotate the driving screw 130. A follower nut 132 is arranged to coact with the driving screw 130 so as to be upwardly or downwardly driven (but not rotated) as the driving screw 130 is rotated. Plural spider arms are mounted to the follower nut 132 for conjoint movement upwardly or downwardly with the follower nut 132. These spider arms include a spider arm 134 for pivoting each rocker arm 24 and a spider arm 136 for pivoting each rocker arm 26.

Each spider arm 134, 136, carries a bearing member 140 having two diametrically opposed grooves 142, each defining oblique camming surfaces. A lower portion 150 of each rocker arm 24, 26, has a circular aperture 152, which receives a cylindrical pin 154 having two tabular ends 156, each defining planar camming surfaces. Each tabular end 156 fits into a respective one of the opposed grooves of the bearing member 140 carried by the spider arm 134, 136, associated with a respective one of the rocker arms 24, 26.

Thus, when the driving screw 130 is rotated so as to drive the follower nut 132 and the spider arms 24, 26, upwardly, the rocker arms 24, 26, are pivoted in one pivotal sense. Also, when the driving screw 130 is rotated oppositely, the rocker arms 24, 26, are pivoted oppositely.

As shown, the rocker arms 24, 26, are arranged to be inwardly pivoted at their lower ends when the follower nut 132 and the spider arms 134, 136, are driven upwardly, and vice-versa. It is possible to invert the bearing members 140 and to reverse the rocker arms 24, 26, so that the rocker arms 24, 26, are pivoted oppositely when the follower nut 132 and the spider arms 134, 136, are driven upwardly, and vice-versa.

As shown in FIG. 1, a loading and unloading stand 40 is provided, which supports a hydraulic motor 42. The hydraulic motor 42 is adapted to be removably coupled to the screw-actuated mechanism 30 in a known manner, via an output shaft of the hydraulic motor 42 and matched couplings on such shaft and on the driving screw 32 respectively, when the chuck 10 is mounted in a known manner on a pallet 44, which is supported on the stand 40. The hydraulic motor 42 is reversible and, when coupled to such mechanism 30, is operable selectively for closing the jaws 20 of the outer set or the jaws 22 of the inner set, whichever are used, and for opening the same jaws. The hydraulic motor 42 may be similarly coupled to the screw-actuated mechanism of either of the chucks 10', 10", of the aforenoted system. The need addressed by this invention arises because the chucks 10, 10', tend to have minor dimensional variations, variations in lubrication, and other variations from one chuck of the system to another.

Two strain gauges 50 are mounted to the rocker arm 24 associated with one jaw 20 of the outer set. Two strain gauges 52 are mounted to the rocker arm 26 associated with one jaw 22 of the inner set. The strain gauges 50, 52, are similar. Suitable strain gauges are available commercially from Sensor Developments Inc. of Lake Orion, Mich., under Model No. GF2370SD1. Each strain gauge mounted to the rocker arm associated with one of the jaws being used to grip a workpiece senses the gripping force of such jaws, by sensing the resulting deformation of the rocker arm mounting such strain gauge, since the gripping force tends to be substantially equalized among such jaws. Each strain gauge emits an electrical signal representative of the gripping force of such jaws. Two electrical connectors are mounted on the main body 18, namely an electrical connector 54 associated with and connected by electrical wires to the strain gauges 50 and an electrical connector 56 associated with and connected by electrical wires to the strain gauges 52.

A computer 60 is arranged to receive, via a cable 62 connected to the chuck 10 and an analog-to-digital card 64 installed in the computer 60, the electrical signals from the strain gauges 50 or from the strain gauges 52, whichever are used, and to average such signals. The cable 62 is plugged into the electrical connector 54, if the jaws 20 and the strain gauges 50 are used, or into the electrical connector 56, if the jaws 22 and the strain gauges 52 are used. The computer 60 is programmed with pre-calibration values, which represent the gripping force applied by the jaws 20 and the gripping force applied by the jaws 22, at varying rates of flow of hydraulic fluid into and from the hydraulic motor 42. The computer 60 is arranged, via an input-output card 66 installed in the computer 60 and a control relay 68 connected to the input-output card 66 by a cable 70, to control two valves, namely a remote, electrically modulated, flow control valve 78 and a four-way, spring-centered, solenoid valve 80. Suitable valves are available commercially from Vickers, Incorporated of Troy, Mich. A suitable valve for the flow control valve 78 is available commercially therefrom under Model Series FCGT-02. A suitable valve for the four-way valve 80 is available commercially therefrom under Model Series DG4S4-01. Cables 72, 74, are used to connect the control relay 68 to the respective valves 78, 80.

A hydraulic pump 90 is arranged to draw hydraulic fluid from a reservoir 92 and to pump hydraulic fluid into the four-way valve 80. The four-way valve 80 is connected to a jaw-opening port of the hydraulic motor 42. The flow control valve 78 is connected between the four-way valve 80 and a jaw-closing port of the hydraulic motor 42. The hydraulic motor 42 is arranged in such manner that hydraulic fluid flowing into the jaw-opening port of the hydraulic motor 42 and from the jaw-closing port thereof opens the jaws 20 or the jaws 22, whichever are used, and in such manner that hydraulic fluid flowing into the jaw-closing port of the hydraulic motor 42 and from the jaw-closing port thereof closes the same jaws. The four-way valve 80 is spring-centered to a normal condition, in which such valve 80 recirculates hydraulic fluid from the hydraulic pump 90 back to the reservoir 92 when the hydraulic pump 80 is operated, but is switchable via the control relay 66 selectively to a jaw-opening condition and to a jaw-closing condition.

In the jaw-opening condition, in which the spool of the four-way valve 80 would be fully shifted to the right in FIG. 1, the four-way valve 80 enables hydraulic fluid drawn by the hydraulic pump 90 from the reservoir 92 to flow from the hydraulic pump 90, through the four-way valve 80, into the jaw-opening port of the hydraulic motor 42 and to flow from the jaw-closing port of the hydraulic motor 42, through the flow control valve 78, through the four-way valve 80, back to the reservoir 92. In the jaw-closing condition, in which the spool of the four-way valve 80 would be fully shifted to the left in FIG. 1, the four-way valve 80 enables hydraulic fluid drawn by the hydraulic pump 90 from the reservoir 72 to flow from the hydraulic pump 90, through the four-way valve 80, through the flow control valve 78, into the jaw-closing port of the hydraulic motor 42 and to flow from the jaw-opening port of the hydraulic motor 42, through the four-way valve 80, back to the reservoir 92.

When a particular workpiece is to be loaded into the chuck 10, the chuck 10 is mounted on the pallet 44, whereupon the pallet 44 is supported on the loading and unloading stand 40 in such manner that the hydraulic motor 42 is coupled to the screw-actuated mechanism 30 for closing the jaws 20 or the jaws 22, whichever are to be used to grip such workpiece. Suitable codes are entered into the computer 60 to designate that such jaws are to be opened, to designate the particular workpiece, and to designate the desired magnitude of the gripping force to be applied by such jaws to such workpiece.

While the hydraulic pump 90 is operated, the computer 60 sends a signal causing the control relay 68 to switch the four-way valve 80 to its jaw-closing condition, in which such valve 80 allows hydraulic fluid to flow through it to the jaw-closing port of the hydraulic motor 42. Initially, the computer 60 sends a signal causing the control relay 68 to control the flow control valve 78 so that such valve 78 allows hydraulic fluid to flow through it at a relatively fast rate, so as to overcome friction lock-up in the chuck 10.

The strain gauges 50 associated with one of the jaws 20 or the strain gauges 52 associated with one of the jaws 22, whichever are being used, emit electrical signals representing the gripping force being applied by such jaws to the particular workpiece. The computer 60 receives and averages such signals. When the averaged signals indicate that such force has increased beyond a predetermined minimum, the computer 60 sends a signal causing the control relay 68 to control the flow control valve 78 so that such valve 78 allows hydraulic fluid to flow through it at a relatively slow rate. When the averaged signals indicate that the gripping force approximates a desired magnitude, which is predetermined, the computer 60 sends a signal causing the control relay 68 to return the four-way valve 80 to its normal condition, in which such valve 80 allows hydraulic fluid to recirculate from the hydraulic pump 90 back to the hydraulic reservoir 92.

The pallet-mounted chuck 10 and the workpiece gripped thereby may be then removed from the loading and unloading stand and may be next carried to a machine tool (not shown) for machining of the workpiece while it is gripped by the chuck 10. After machining of the workpiece gripped thereby, the pallet-mounted chuck 10 and such workpiece may be then returned to the loading and unloading stand 40 for unloading of the workpiece.

When the workpiece gripped thereby is to be unloaded, the pallet-mounted chuck 10 is supported on the loading and unloading stand 40 in such manner that the hydraulic motor 42 is coupled to the screw-actuated mechanism 30 for opening the jaws 20 or the jaws 22, whichever are being used to grip such workpiece. While the hydraulic pump 90 is operated, the computer 60 sends a signal causing the control relay 68 to switch the four-way valve 80 to its jaw-opening condition, in which such valve 80 allows hydraulic fluid to flow through it to the jaw-opening port of the hydraulic motor 42. Simultaneously, the computer 60 sends a signal causing the control relay 68 to control the flow control valve 78 so that such valve 78 allows hydraulic fluid to flow through it at a relatively fast rate, so as to overcome friction lock-up in the chuck 10.

As shown in FIG. 1, the computer 60 may be optionally connected to a printer 100, so as to record the signals received from the strain gauges, the codes entered into the computer 60, and related data.

This invention enables the gripping force applied by the jaws 20 of the inner set or the jaws 22 of the outer set, whichever are used to grip a particular workpiece, to be precisely controlled. Close tolerances are achievable despite minor dimensional variations, variations in lubrication, and other variations from one chuck of the system to another.

The system described above may be enhanced by arranging the computer 60, the control relay 68, and the respective valves 78, 80, to operate the hydraulic motor 42 in a manner responsive to the strain gauges of the respective chucks of the system, for controlling the screw-actuated mechanisms of the respective chucks of the system in such manner that the gripping force applied by the jaws of each chuck of the system approximates a desired magnitude. The desired magnitude may vary from one chuck of the system to another.

Various modifications may be made in the preferred embodiment described above without departing from the scope and spirit of this invention.

We claim:

1. An adjustable chuck for gripping workpieces of different sizes, the chuck comprising:
   (a) a plurality of jaws mounted for relative movement between an opened condition and a closed condition;
   (b) means including a rocker arm mounting each of the jaws for closing the jaws to grip a workpiece by causing relative movement of the jaws toward the closed condition, in which the jaws apply a gripping force to the workpiece;
   (c) means comprising a pair of strain gauges mounted to the rocker arm mounting one of the jaws for sensing the gripping force applied by the jaws to a workpiece when the jaws are closed so as to grip the workpiece; and
   (d) means responsive to the sensing means for controlling the closing means in such manner that the gripping force applied by the jaws to a workpiece approximates a desired magnitude.

2. The adjustable chuck of claim 1 wherein the controlling means comprises a hydraulic motor, which is arranged to drive the closing means for closing the jaws so as to grip the workpiece, and means for controlling flow of hydraulic fluid relative to the hydraulic motor in a manner responsive to the sensing means.

3. A system for gripping workpieces of different sizes, the system comprising:
   (a) a plurality of similar, adjustable chucks, each comprising:
      (1) a plurality of jaws mounted for relative movement between an opened condition and a closed condition;
      (2) means including a rocker arm mounting each of the jaws for closing the jaws to grip a workpiece by causing relative movement of the jaws toward the closed condition, in which the jaws apply a gripping force to the workpiece;
      (3) means comprising a pair of strain gauges mounted to the rocker arm mounting one of the jaws of such chuck for sensing the gripping force applied by the jaws to a workpiece when the jaws are closed to grip the workpiece; and
   (b) means responsive to the sensing means of a selected chuck of the system for controlling the closing means of the selected chuck in such manner that the gripping force applied by the jaws of the selected chuck to a workpiece approximates a desired magnitude;
wherein the controlling means is operable in such manner that the gripping force applied by the jaws of each chuck of the system approximates said desired magnitude despite minor variations from one chuck of the system to another.

4. The system of claim 3 wherein the controlling means comprises a hydraulic motor, which is arranged to drive the opening and closing means of the selected chuck selectively for closing the jaws of the selected chuck so as to grip the workpiece and for opening the jaws of the selected chuck so as to free the workpiece, and means for controlling flow of hydraulic fluid into and from the hydraulic motor in a manner responsive to the sensing means of the selected chuck.

5. The system of claim 3 wherein the controlling means is responsive to the sensing means of the respective chucks of the system for controlling the closing means of the respective chucks of the system in such manner that the gripping force applied by the jaws of each chuck of the system to a workpiece approximates said desired magnitude, which may vary from one chuck of the system to another and wherein the controlling means is operable in such manner that the gripping force applied by the jaws of each chuck of the system approximates said desired magnitude despite minor variations from one chuck of the system to another.

* * * * *